(12) United States Patent
Huang

(10) Patent No.: US 6,250,098 B1
(45) Date of Patent: Jun. 26, 2001

(54) SUPPORT FRAME FOR AN ICE-STORING TANK FOR AN AIR CONDITIONER WITH AN ICE-STORING MODE

(76) Inventor: Chung-Ping Huang, No. 134, Yen Ping Road, Hsinying, Tainan-Hsien (TW)

( * ) Notice: Subject to any disclaimer, the term of this patent is extended or adjusted under 35 U.S.C. 154(b) by 0 days.

(21) Appl. No.: 09/500,030

(22) Filed: Feb. 8, 2000

(51) Int. Cl.⁷ .................................................. F25D 11/00
(52) U.S. Cl. .......................... 62/430; 165/163; 165/168
(58) Field of Search .......................... 62/430, 434, 436, 62/389, 394, 56, 59; 165/157, 163, 168

(56) References Cited

U.S. PATENT DOCUMENTS

| | | | |
|---|---|---|---|
| 2,805,048 | * 9/1957 | Angelery | 165/163 |
| 3,746,084 | * 7/1973 | Ostbo | 165/163 |
| 4,036,621 | * 7/1977 | Burton | 62/434 |
| 4,143,816 | * 3/1979 | Skadeland | 165/163 |
| 4,201,262 | * 5/1980 | Goldstein | 62/394 |
| 4,893,672 | * 1/1990 | Bader | 165/163 |
| 4,932,467 | * 6/1990 | Wigmore et al. | 165/163 |
| 5,046,331 | * 9/1991 | O'Neal et al. | 165/163 |
| 5,109,920 | * 5/1992 | Merryfull | 165/163 |
| 5,165,472 | * 11/1992 | Cloutier | 165/163 |
| 5,423,378 | * 6/1995 | Dillenbeck et al. | 165/163 |
| 5,660,165 | * 8/1997 | Lannes | 165/163 |

* cited by examiner

Primary Examiner—Philip H. Leung
Assistant Examiner—Fadi Dahbour
(74) Attorney, Agent, or Firm—Rosenberg, Klein & Lee

(57) ABSTRACT

A support frame for an ice-storing tank for an air conditioner with an ice-storing mode includes plural rods formed in a radial direction, and each rod has plural grooves for fitting therein a spiral hollow tube of one of plural spiral tube units. Further a connector is provided in the center of the base, having plural insert vertical grooves formed in a radial direction to connect to inner ends of the rods of the support frame. All the connectors are piled up one by one to connect with all the rods of the spiral tube units, increasing combining and supporting strength.

2 Claims, 11 Drawing Sheets

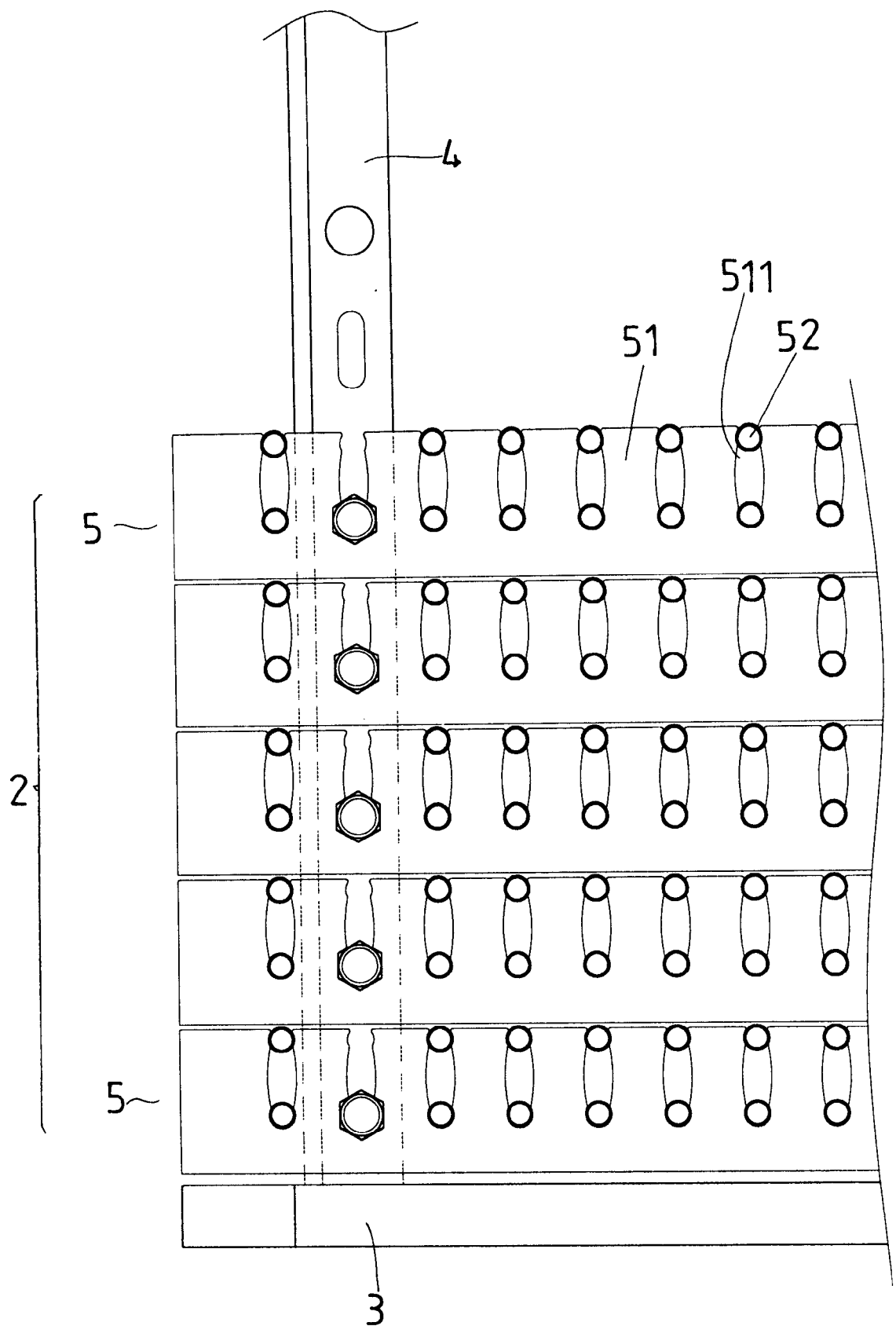
F I G. 3

SUPPORT FRAME FOR AN ICE-STORING TANK FOR AN AIR CONDITIONER WITH AN ICE-STORING MODE

BAKGROUND OF THE INVENTION

This invention relates to a support frame for an ice-storing tank for an air conditioner with an ice-storing mode, particularly to one possible to increase connection and support strength.

Applicant of this invention filed a patent application titled "ICE-STORING TANK FOR AN AIR CONDITIONER WITH AN INCE-STORING MODE" on Aug. 11, 1999 with Ser. No. 09/371,852.

As shown in FIGS. 10–13, the application of Ser. No. 09/371,852 includes spiral tube units 2 in a temperature-preserving tank 1, which has an characteristic that each spiral tube unit 2 has a base 3 and a plurality of vertical long rods 4 at an outer edge. A plurality of independent coil tubes 5 are placed on the base 3, and each coil tube 5 having a hollow tube 52 is placed circling around on the support frames 51 arranged in radial direction. The outer ends of the support frames 51 are connected tightly to the long frames 4, and the hollow tube 52 has a joint at two ends. A vertical inlet tube 6 and a vertical outlet tube 7 are positioned outside of the base, respectively having a plurality of connect mouths 61, 71 for the joints of the two ends of each hollow tube 52 to screw with and communicate with one another. The upper ends of the inlet tube 6 and the outlet tube extend out of the temperature preserving tank 1 to form an inlet and outlet for coolant liquid to flow in and out. If any of the hollow tubes 52 leaks, each spiral tube 5 is orderly taken out for check to find which one leaks, without need of breaking the floor to use a crane to hang up and out the heavy and large spiral tube unit, facilitating repair and saving expenditure.

However, the support frames 51 for spiral tube units 5 has plural rods having inner ends not properly connected with each other, so their connection and support strength have to be reinforced. Therefore, this invention has been devised.

SUMMARY OF THE INVENTION

This invention is to offer a support frame for an ice-storing tank for an air conditioner with an ice-storing mode, and the ice-storing tank consists of plural spiral tube units contained in the temperature preserving tank. The spiral tube units are positioned on a base and a plurality of vertical long rods fixed around the outer circumference of the base. Then, a plurality of independent spiral tubes are orderly placed on the upper surface of each support frame. Each rod of the support frames arranged in a radial direction has a plurality of grooves for the spiral hollow tubes to fit therein, and the outer ends of the rods of each support frame are connected tightly to the vertical long rods. A vertical inlet tube and a vertical outlet tube are installed outside the base, connected to the two ends of each hollow tube, and extends out of the temperature preserving tank to form an inlet and an outlet for coolant liquid. The characteristic is a connector for connect inner ends of the rods of the support frames to increase tightness of mutual combination and strength of the support frames, and thus also the support strength.

BRIEF DESCRIPTION OF DRAWINGS

This invention will be better understood by referring to the accompanying drawings, wherein:

FIG. 3 is a partial magnified view of FIG. 2.

DETAILED DESCRIPTION OF THE PREFERRED EMODIMENT

Figure 1:
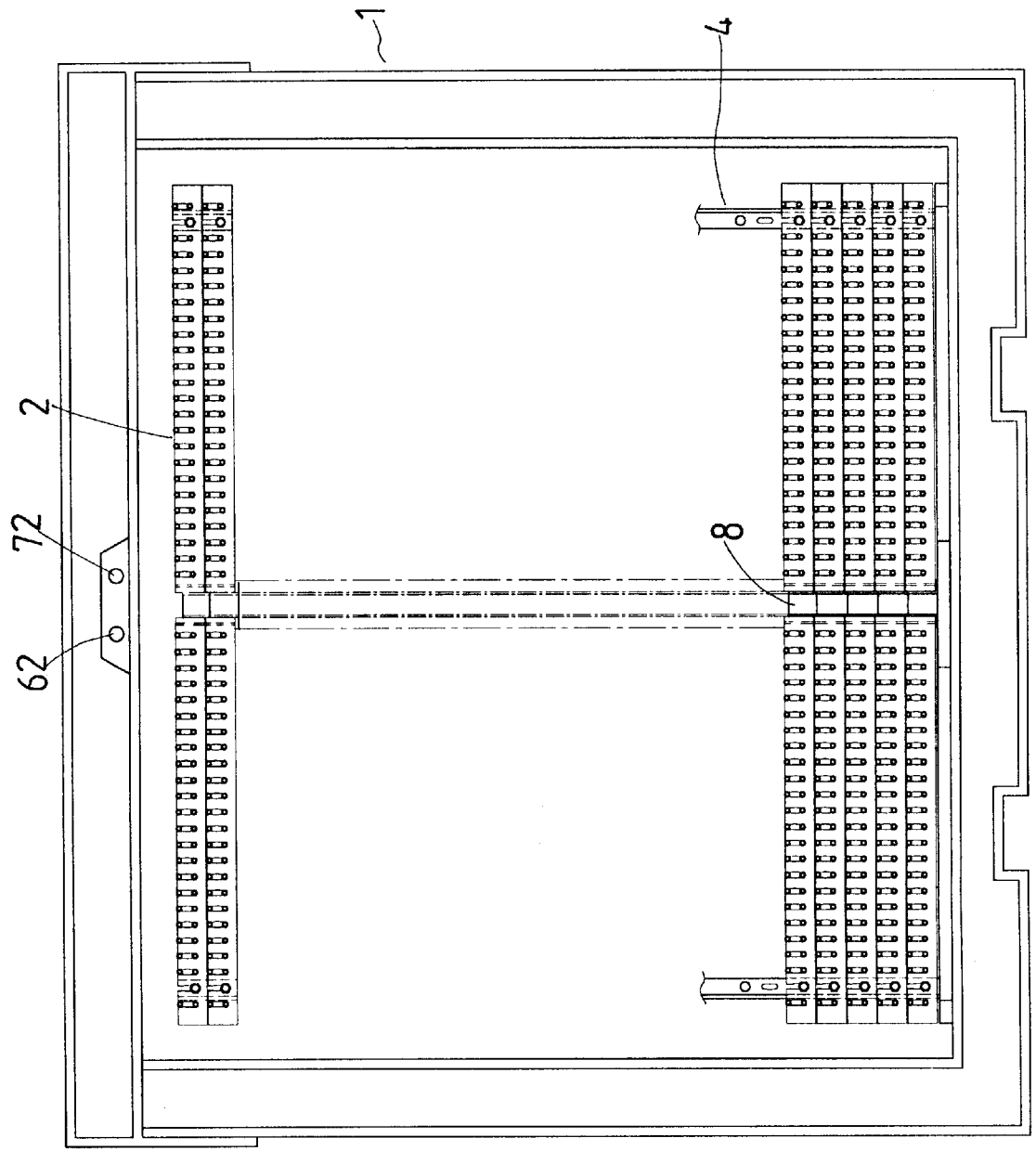
FIG. 1 is a cross-sectional view of an ice-storing tank of the present invention.
Figure 2:
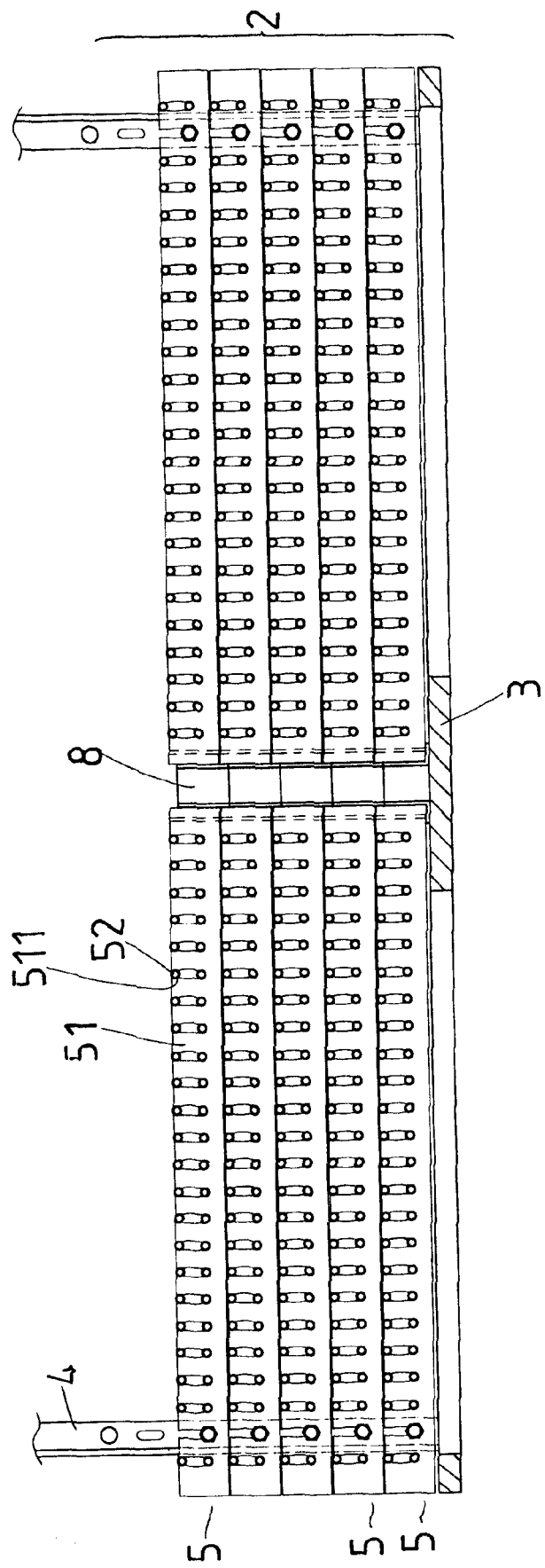
FIG. 2 is a cross-sectional view of spiral tube units of the present invention.
Figure 4:
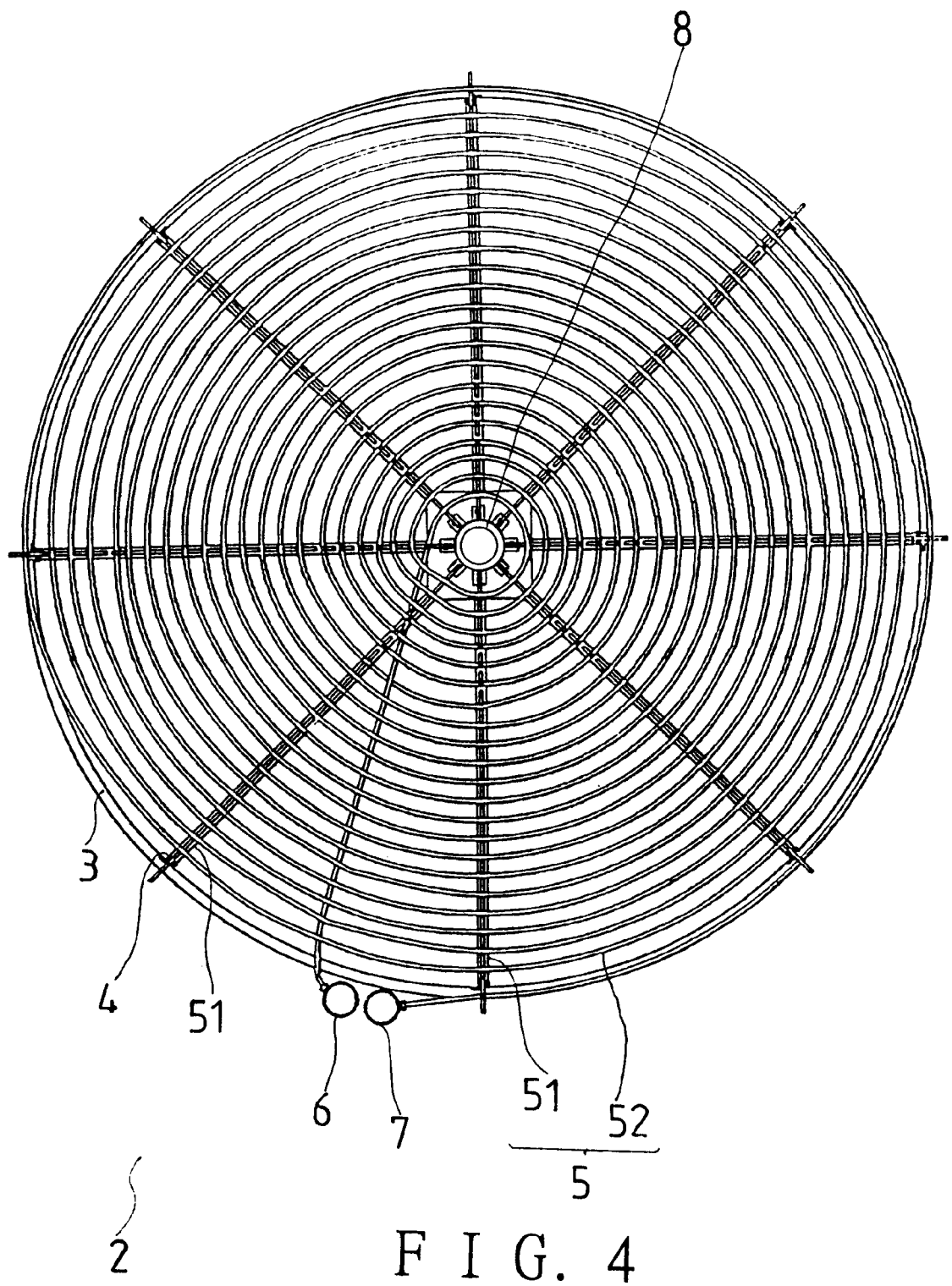
FIG. 4 is an upper view of the spiral tube units of the present invention.
Figure 5:
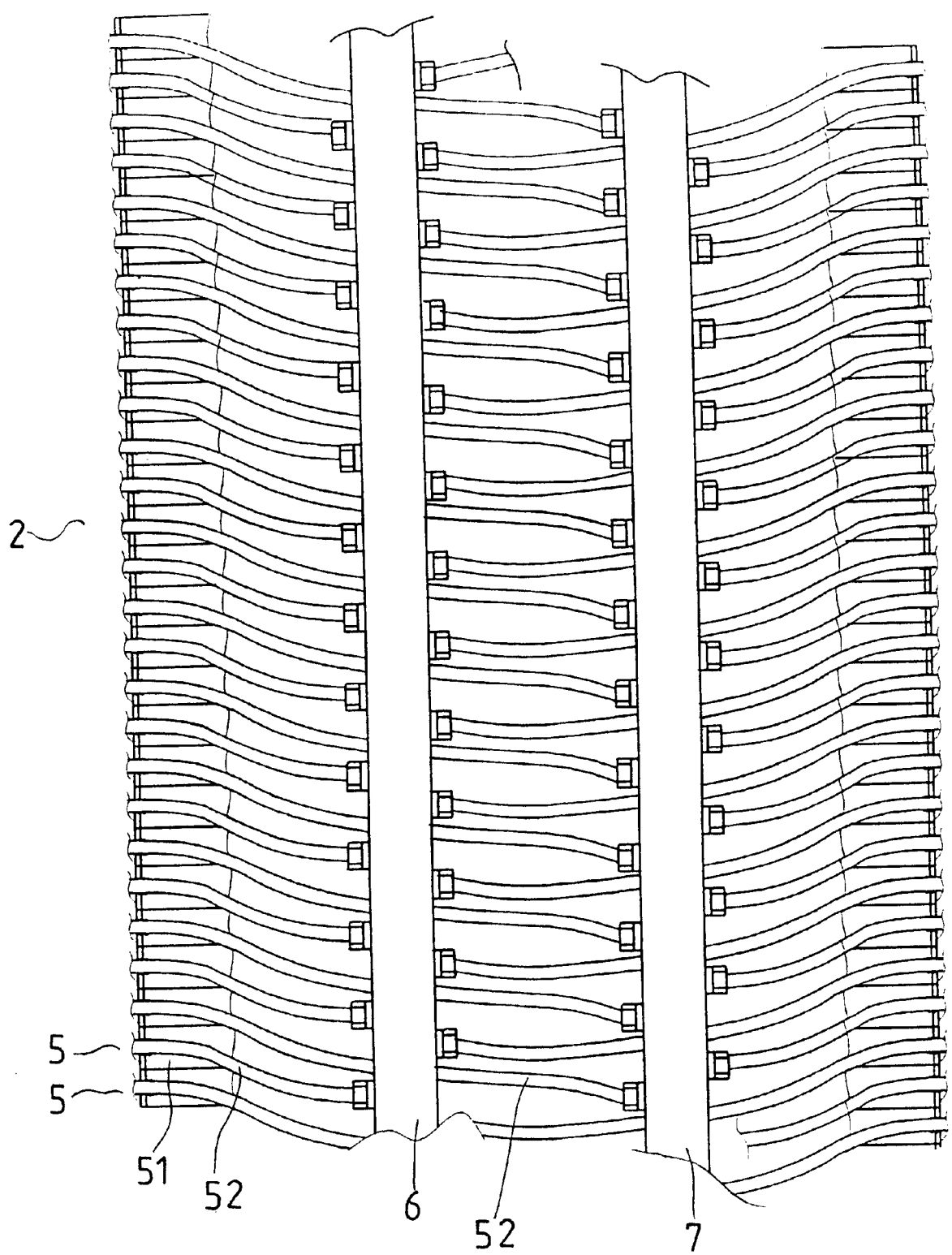
FIG. 5 is a front view of the spiral tube units of the present invention.

An ice-storing tank, for which a support frame in the invention is used for, consists of a temperature preserving tank 1, and a set of spiral tube units 2 combined in the temperature preserving tank 1. Plural spiral tube units 2 are positioned on a base 3, and a plurality of vertical long rods 4 are fixed around an outer edge of the base 3.

A plurality of independent spiral tubes 5 are positioned on an upper surface of the base 3, having spiral hollow tubes 52 fitted in plural grooves 511 formed in rods of the support frames 51. Each rod of the support frames 51 has an outer end connected tightly to the long vertical rods 4, and an inner end combined with a connector 8. A vertical inlet tube 6 and a vertical outlet tube are installed outside the base 3, and two ends of each spiral hollow tube 52 are respectively connected and communicate with the inlet tube 6 and the outlet tube 7. The inlet and the outlet tube 6 and 7 extend out of the temperature preserving tank 1 to form an inlet 62 and outlet 72 of coolant liquid.

Each spiral tube unit 5 has a connector 8, which has a plurality of inserting grooves 81 formed a radial direction for inner ends of rods of the support frames 51 to fit tightly therein, as shown in FIGS. 2, 4, 6 and 7. Each insert groove 81 has a vertical projecting strip 811 to engage with a vertical groove 512 formed in an inner end of each rod of the support frames 51. Thus, all of the connectors 8 of all the spiral tube units 5 are piled up one by one in the center of the base 3, connecting with the inner ends of all rods of all the support frames 51 and subsequently increasing combining support strength. In addition, a connect frame 82 may be connected in one of the insert grooves 81, having a long recess in an intermediate portion to facilitate the hollow tubes 52 to easily bent around the center of the connector 8.

Figure 6:
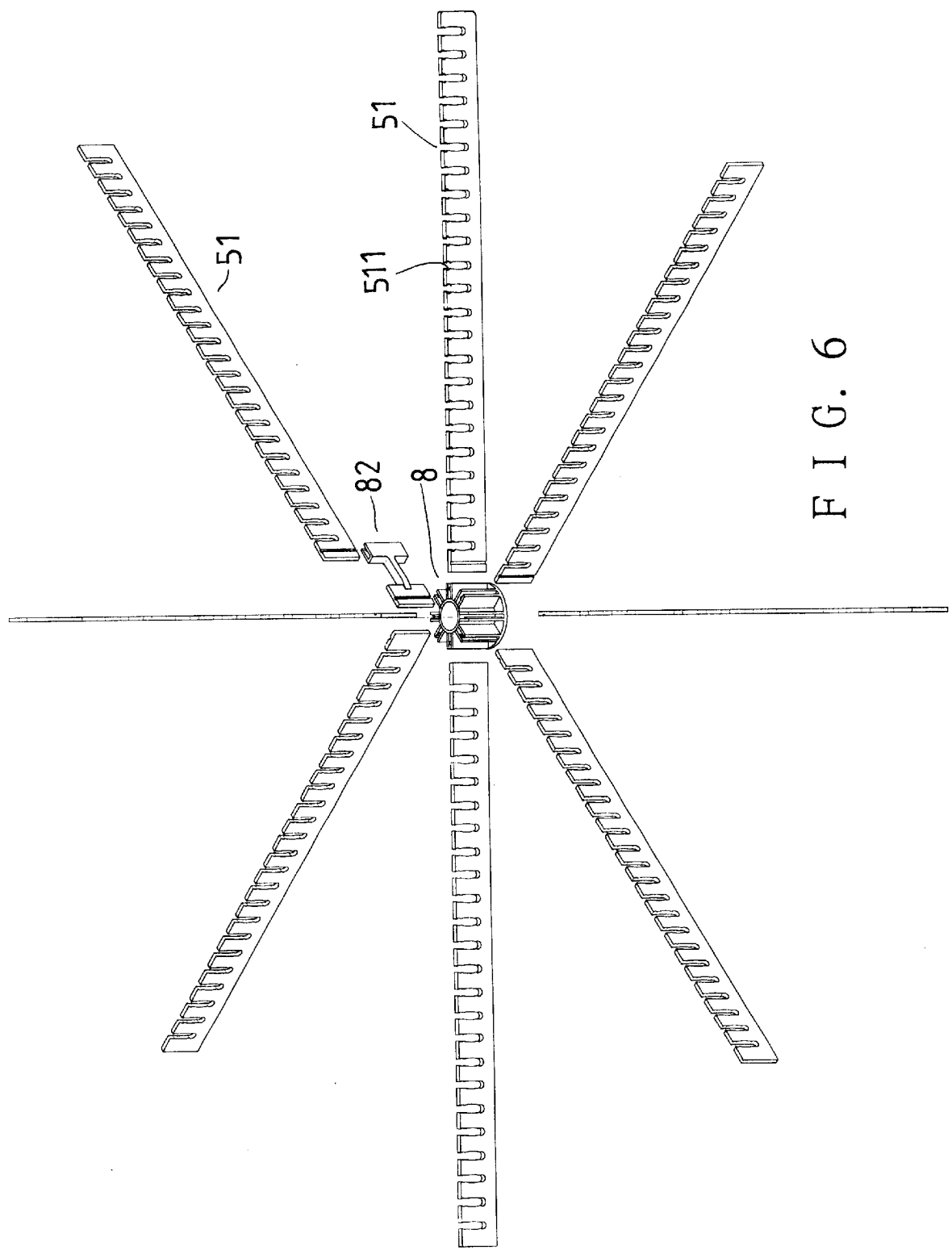
FIG. 6 is an exploded perspective view of a connector and the support frame of the present invention.
Figure 7:
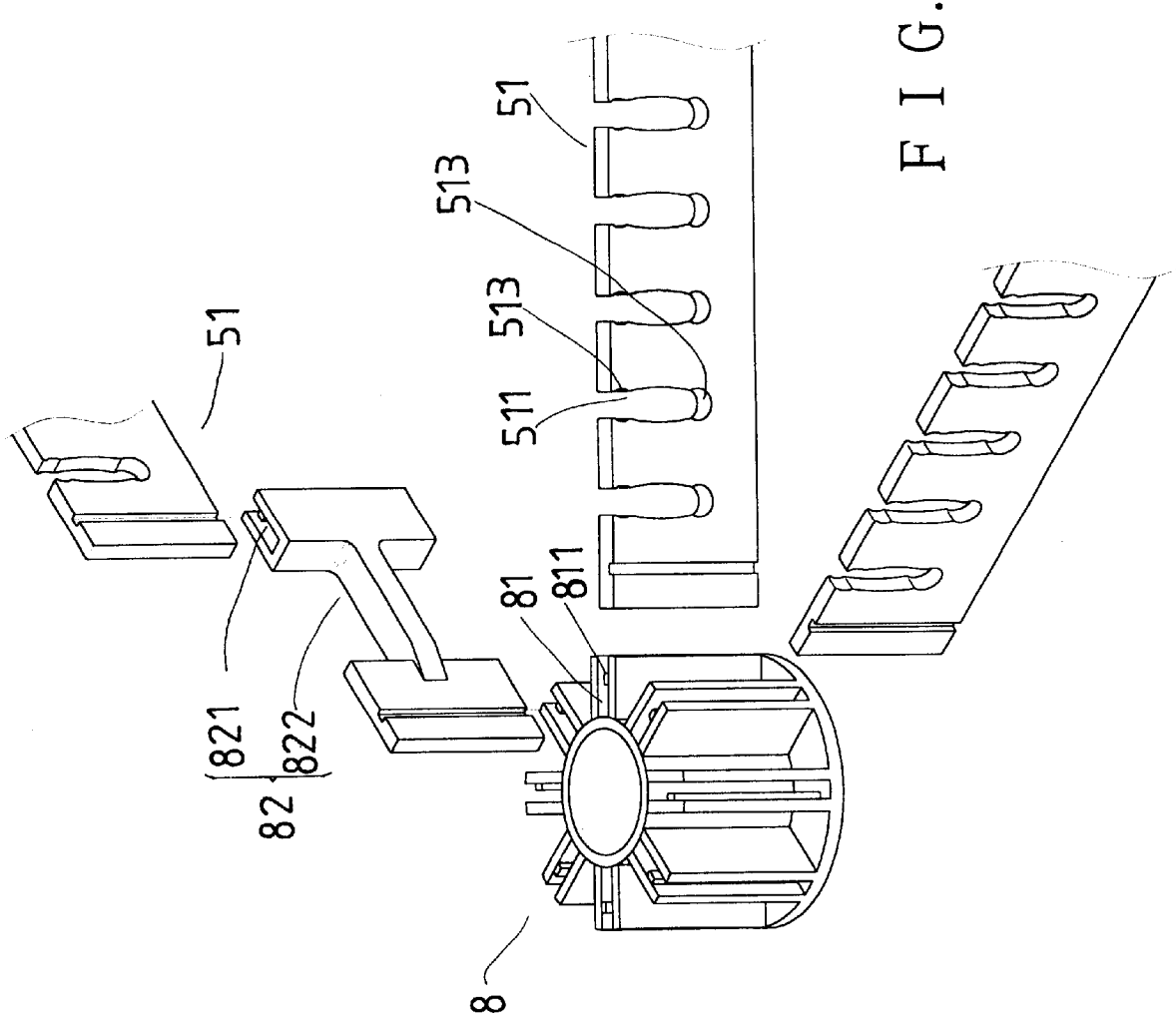
FIG. 7 is a magnified exploded view of the connector and a partial support frame of the present invention.
Figure 9:
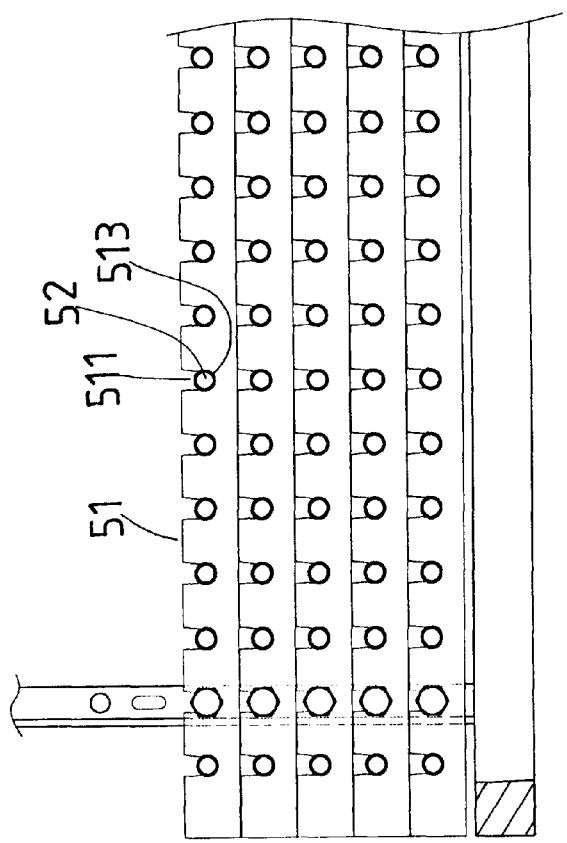
FIG. 9 is a partial magnified view of FIG. 8.
Figure 8:
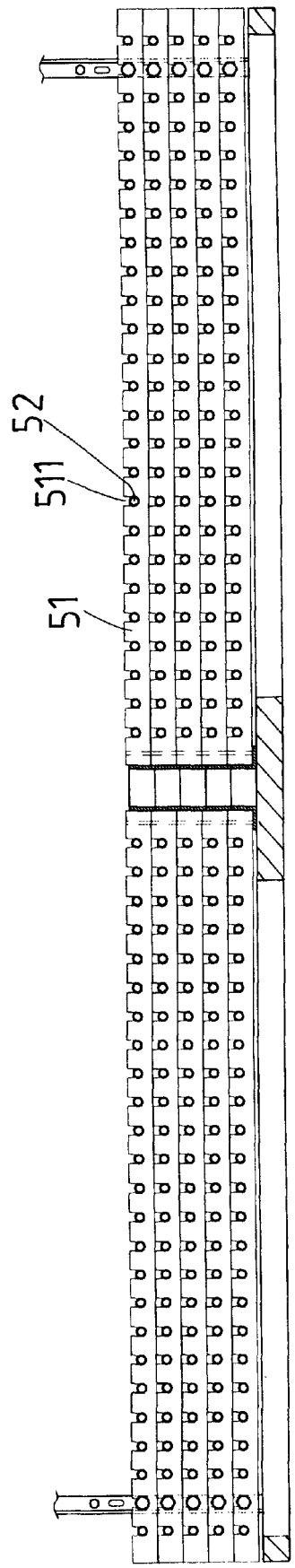
FIG. 8 is a side view of another embodiment of a support frame of the present invention.
Figure 10:
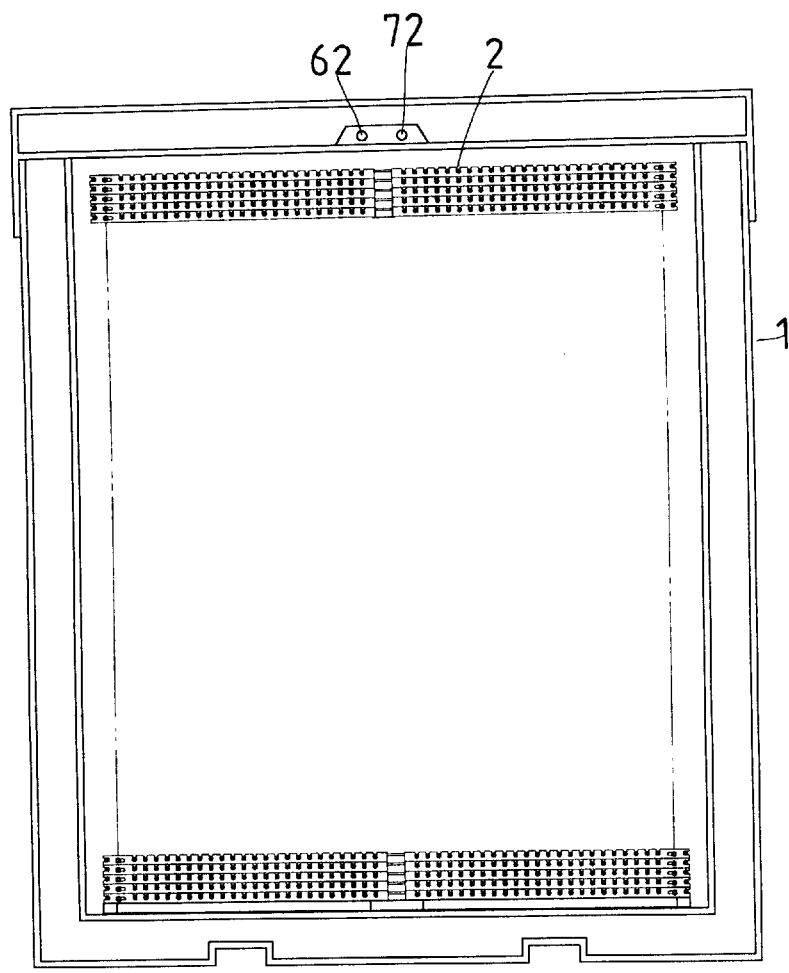
FIG. 10 is a cross-sectional view of the ice-storing tank of the application Ser. No. 09/371,852.
Figure 11:
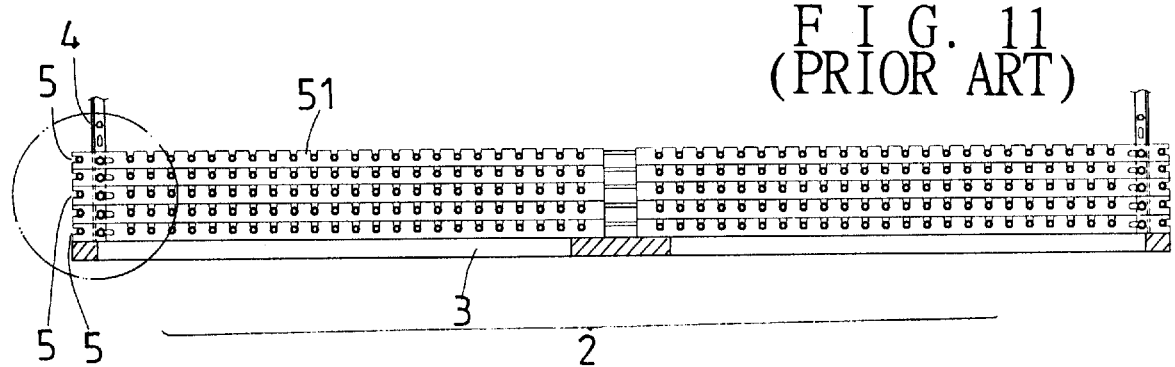
FIG. 11 is a cross-sectional view of the spiral tube units of application Ser. No. 09/731,852.
Figure 12:
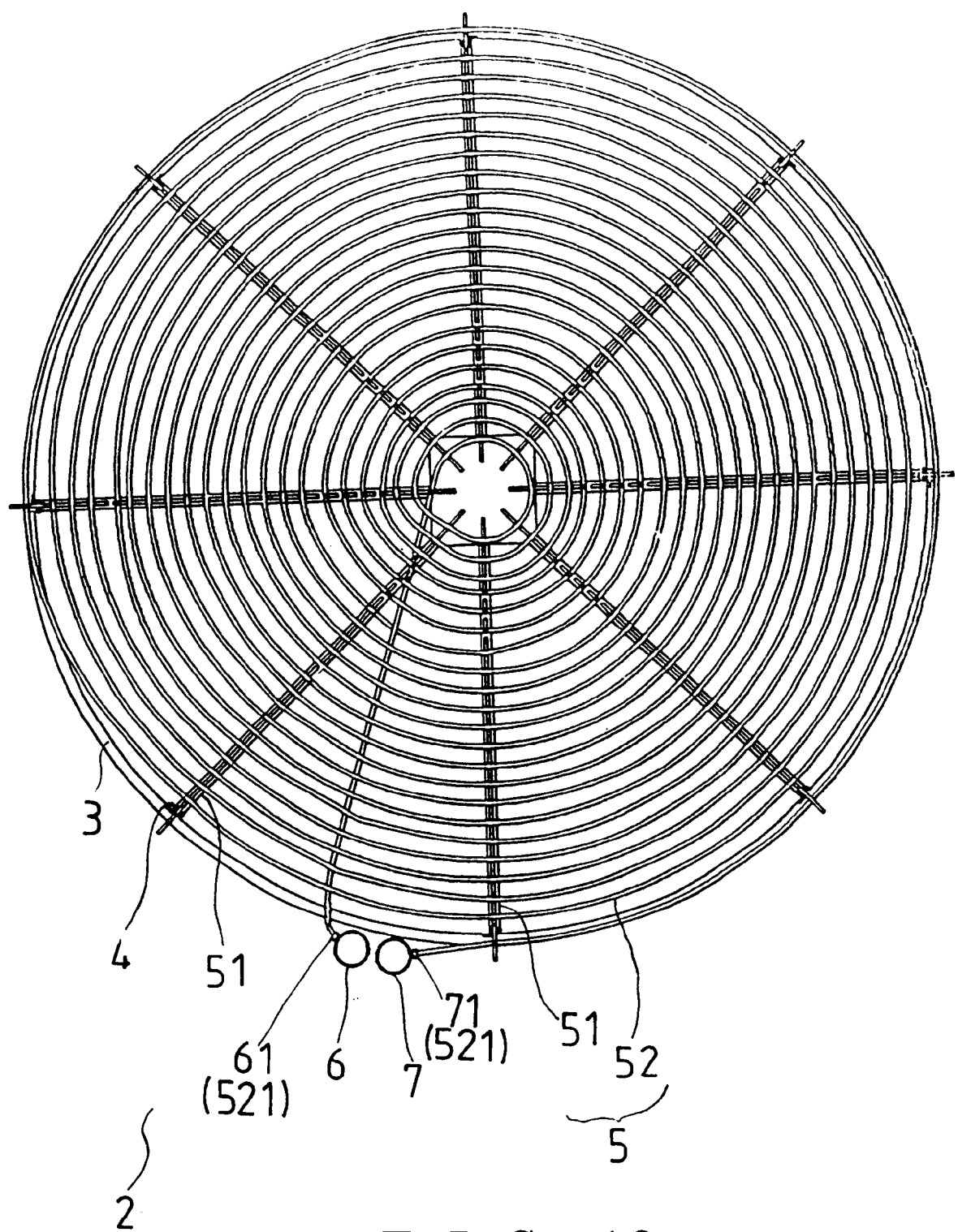
FIG. 12 is an upper view of the spiral tube units of application Ser. No. 09/371,852.
Figure 13:
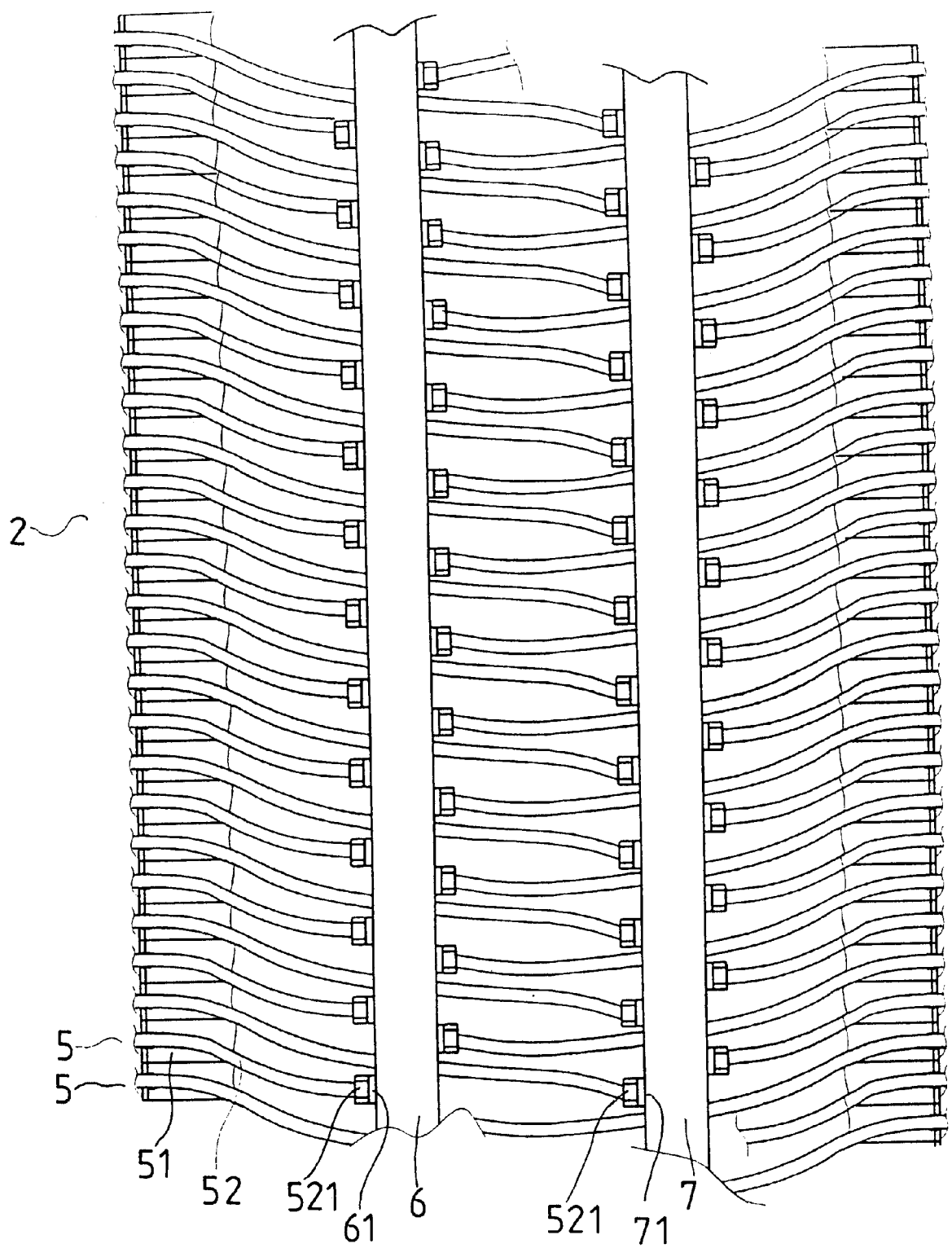
FIG. 13 is a front view of the spiral tube units of application Ser. No. 09/371,852.

Next, as shown in FIGS. 8 and 9, the grooves 511 in each rod of the support frames 51 have a fitting hole 513 formed in the bottom for a hollow tube 52 to fit therein, so each spiral tube unit has only one spiral hollow tube 52. Besides, as shown in FIGS. 6 and 7, the grooves 511 may have two fitting holes 513 respectively in an upper end and in a bottom for two spiral hollow tubes 52 to fit therein, so each spiral tube unit 2 has two spiral hollow tubes 52.

The invention has the following advantages as can be seen from the aforesaid description.

1. A connector 8 connects the inner ends of plural rods of the support frames 51, increasing mutual combining tightness and strength of all the rods of the support frames 51.

2. All the connectors 8 of the spiral tube units are piled up orderly in the center of the base 3, making up a stable column to support the center of all the spiral tube units 5, reinforcing support strength.

What is claimed is:

1. A support frame for an ice-storing tank for an air conditioner of an ice-storing mode comprises a support frame for supporting each of plural spiral tube units contained in a temperature preserving tank of an ice-storing tank for an air conditioner, said spiral tube units supported by a base, said base having a plurality of vertical rods spaced around an outer edge of said base, a plurality of independent spiral tubes orderly placed on an upper surface of each of a plurality of rods of said support frame, said support frame plural rods formed to extend in a radial direction, each said rod having plural grooves spaced apart properly for said spiral hollow tube of said spiral tube unit to fit therein, outer ends of said rods of said support frame connected tightly to said long vertical rods of said base, an inlet vertical tube and an outlet vertical tube installed outside of said base and respectively connected and communicating with two ends of each said spiral hollow tube, said inlet and said outlet tube extending out of said temperature preserving tank to form an inlet and an outlet for coolant liquid; characterized by a connector connected with each said spiral tube unit, said connector having a plurality of insert grooves provided in a radial direction for an inner end of each said rod of said support frame to fit tightly therein, each said insert groove having a vertical projecting strip to engage with a vertical groove formed in the inner end of each said rod of said support frame, all of said connectors of all said spiral tube units piled up one by one in the center of said base, all of said connectors connected with all said rods of said support frames to increase combining and supporting strength; said connectors respectively having one of said insert groove fitting with a connect frame, said connect frame having an insert groove formed in an outer end for the inner end of said rod of said support frame to fit tightly together, said connect frame also having a long recess in an intermediate portion for said spiral hollow tube to easily be bent acutely to approach the center of said base.

2. The support frame for an ice-storing tank for an air conditioner of an ice-storing mode as claimed in claim 1, wherein each said rod of said support frame has said grooves provided with two insert holes in an upper end and a bottom for two spiral hollow tubes of said spiral tube unit to fit therein, permitting said spiral tube unit to have two spiral hollow tubes.

* * * * *